United States Patent
Potter

(10) Patent No.: US 9,222,637 B2
(45) Date of Patent: Dec. 29, 2015

(54) LIGHTGUIDE WITH HORIZONTAL CUTOFF AND HORIZONTAL SPREAD

(71) Applicant: Brant Potter, Columbus, IN (US)

(72) Inventor: Brant Potter, Columbus, IN (US)

(73) Assignee: Valeo North America, Inc., Seymour, IN (US)

( * ) Notice: Subject to any disclaimer, the term of this patent is extended or adjusted under 35 U.S.C. 154(b) by 208 days.

(21) Appl. No.: 13/827,133

(22) Filed: Mar. 14, 2013

(65) Prior Publication Data

US 2014/0268847 A1    Sep. 18, 2014

(51) Int. Cl.
    *F21V 9/00*      (2015.01)
    *F21S 8/10*      (2006.01)
    *F21V 8/00*      (2006.01)
    *G02B 19/00*     (2006.01)

(52) U.S. Cl.
CPC ............ *F21S 48/10* (2013.01); *F21S 48/1159* (2013.01); *F21S 48/1225* (2013.01); *F21S 48/1241* (2013.01); *G02B 6/0045* (2013.01); *G02B 19/0028* (2013.01); *G02B 19/0061* (2013.01)

(58) Field of Classification Search
CPC ... F21S 48/10; F21S 48/1159; F21S 48/1225; F21S 48/1241; F21S 8/10; F21V 8/00; G02B 19/0028; G02B 19/0061; G02B 6/0045; G02B 19/00
See application file for complete search history.

(56) References Cited

U.S. PATENT DOCUMENTS

| | | | |
|---|---|---|---|
| 5,086,376 A | 2/1992 | Blusseau | |
| 5,461,549 A | 10/1995 | Lietar et al. | |
| 5,921,671 A | 7/1999 | Okuchi et al. | |
| 6,945,672 B2 | 9/2005 | Du et al. | |
| 7,207,705 B2 | 4/2007 | Ishida | |
| 7,524,091 B2 | 4/2009 | King | |
| 7,607,811 B2 | 10/2009 | Okada | |
| 7,661,860 B2 | 2/2010 | De Lamberterie | |
| 8,517,581 B2 | 8/2013 | Futami | |
| 8,702,287 B2 | 4/2014 | Ohno | |

(Continued)

FOREIGN PATENT DOCUMENTS

| | | |
|---|---|---|
| DE | 102011018508 A1 | 10/2012 |
| EP | 0769653 A1 | 4/1997 |

(Continued)

OTHER PUBLICATIONS

Patent Abstract of EP Publication No. 1895228, Publication Date: Mar. 5, 2008 (1 page).

(Continued)

*Primary Examiner* — Jason Moon Han
*Assistant Examiner* — Omar Rojas Cadima
(74) *Attorney, Agent, or Firm* — Jacox, Meckstroth & Jenkins

(57) ABSTRACT

An automotive lightguide includes a main guide portion with a light entrance surface and a reflective rear edge surface; and an exit lens joined to the main guide portion, the exit lens having an exit surface with an arcuate exit profile. In use, light rays from a light source enter the main guide portion through an entrance surface, travel through the main guide portion and reflect off the rear edge surface to the exit lens which images the reflected light rays as a light beam pattern having a predetermined sharp horizontal cutoff and a predetermined horizontal spread, the arcuate profile of the rear edge surface determining the horizontal cutoff and vertical spread of the light beam pattern with respect to the horizontal optical axis H-H, and the exit profile of the exit lens determining the horizontal spread of the light beam pattern.

16 Claims, 8 Drawing Sheets

(56) References Cited

U.S. PATENT DOCUMENTS

| | | |
|---|---|---|
| 8,920,006 B2 | 12/2014 | de Lamberterie |
| 2005/0162857 A1 | 7/2005 | Tsukamoto |
| 2005/0276061 A1* | 12/2005 | Repetto et al. ............... 362/516 |
| 2006/0087860 A1 | 4/2006 | Ishida |
| 2006/0285347 A1 | 12/2006 | Okada |
| 2008/0013333 A1 | 1/2008 | Koizumi et al. |
| 2009/0091944 A1 | 4/2009 | de Lamberterie |
| 2009/0135621 A1 | 5/2009 | Muegge |
| 2011/0122637 A1 | 5/2011 | Futami |
| 2012/0176809 A1 | 7/2012 | Ohno |

FOREIGN PATENT DOCUMENTS

| | | |
|---|---|---|
| EP | 1992868 A1 | 11/2008 |
| EP | 2045515 A2 | 4/2009 |
| EP | 1895228 B1 | 5/2009 |
| EP | 2322848 A2 | 5/2011 |
| EP | 2474779 A1 | 7/2012 |

OTHER PUBLICATIONS

Patent Abstract of EP Publication No. 1992868, Publication Date: Nov. 19, 2008 (1 page).

* cited by examiner

LIGHTGUIDE WITH HORIZONTAL CUTOFF AND HORIZONTAL SPREAD

FIELD

The present disclosure relates to a lightguide used in a vehicle LED headlamp to generate a low beam or a fog beam. The lightguide forms a sharp horizontal cutoff with horizontal spread, and finds application in automotive beam patterns including SAE low beam, SAE\ECE Fog, and other uses. The lightguide provides a main body with a reflective rear edge surface whose arcuate profile determines a horizontal cutoff and an exit lens whose arcuate exit profile determines a horizontal spread of the emitted light beam pattern. Lightguides are used in motor vehicles, but are not limited thereto.

BACKGROUND

In the prior art, a single LED light source was used to make beam patterns with different horizontal cutoffs and horizontal spreads. In low beam and fog pattern applications, in the prior art, LED light sources were used with reflectors, thick lens, and elliptical with projector lens. Internal mirrors, shields or folders were used to form horizontal spreads.

Other lightguides are known in U.S. Pat. No. 7,607,811 (Okada); U.S. Pat. No. 7,661,860 (DeLamberterie); EP 1992868 (Gasquet); EP 1992868 (DeLamberterie); EP 1895228 (Gasquet); U.S. Pat. Appl. Pub 2009/0135621 (Muegge); U.S. Pat. Appl. Pub 2009/0091944 (DeLamberterie); U.S. Pat. Appl. Pub 2006/0285347 (Okada); and U.S. Pat. No. 6,945,672(Du).

U.S. Pat. Appl. Pub 2009/0091944 (DeLamberterie) discloses various high beam patterns obtained by a planar light source using a curved reflector having a concave parabolic rear reflective surface and providing a vertical light exit aperture through which parallel light rays produced by a light source pass out of the reflector in a collimated manner (FIG. 3). DeLamberterie FIG. 12 discloses a horizontal cutoff being achieved by disposing the light source so that the optical focus of the parabolic rear edge is situated on the rear edge of the light source instead of being situated at the center of the light source. DeLamberterie FIG. 13 discloses an embodiment where the vertical light exit aperture is convex towards the front, in an elliptical profile, and the rear reflective surface has a hyperbolic profile with a convexity turned towards the rear. In this embodiment, a first focus is situated on the light source, and a second focus is merged with a focus of the light exit aperture. The light rays passing out of the reflector are parallel to the optical axis.

BRIEF SUMMARY OF DISCLOSED EMBODIMENTS

In one embodiment, a thin vertical lightguide forms a beam pattern with horizontal spread and horizontal cutoff that finds application in automotive beam patterns including SAE low beam, SAE\ECE Fog, SAE\ECE backup, and cornering.

In still another embodiment, the lightguide provides a horizontal cutoff that advantageously allows unique styling in a thin vertical lightguide producing low beam or fog pattern for automotive lighting with a thin aspect reducing package width for packaging flexibility.

In each embodiment, an automotive lightguide includes a main guide portion with a light entrance surface and an arcuate rear edge surface. An exit lens is joined to the main guide portion, the exit lens having an exit surface with an arcuate exit profile. In use, light rays from a light source enter the main guide portion through an entrance surface, travel through the main guide portion and reflect off the rear edge surface to the exit lens which images the reflected light rays as a light beam pattern having a predetermined horizontal cutoff and a predetermined horizontal spread. The arcuate profile of the rear edge surface controls vertical distribution of the reflected light and thereby determines the horizontal cutoff of the light beam pattern with respect to the horizontal optical axis H-H (or horizon H-H line). The exit profile of the exit lens determines the horizontal spread of the light beam pattern.

BRIEF DESCRIPTION OF THE FIGURES

Features and advantages of the claimed subject matter will be apparent from the following detailed description of embodiments consistent therewith, which description should be considered with reference to the accompanying drawings, wherein:

DETAILED DESCRIPTION OF PREFERRED EMBODIMENTS INCLUDING BEST MODE FOR CARRYING OUT

The embodiments provide a monolithic lightguide 10 with horizontal spread and horizontal cutoff suitable for use with a vehicle lighting device 1. The embodiments disclosed below concern a vehicle lighting device 1; however, the other embodiments are not limited to vehicle lighting devices.

The lighting device 1 is comprised of a light source located at a light emitting element-receiving location 5 and the lightguide 10.

The lightguide 10 may be made of any appropriate optical material such as transparent plastic (e.g., Lucite) or glass, and may be clear, translucent, or colored. The transparent material has a high index of refraction, at least higher than the index of refraction of air, to allow entering light rays to travel by successive reflections therein.

The light source may be a solid-state light emitting element, e.g., a Light Emitting Diode (LED).

Figure 1:
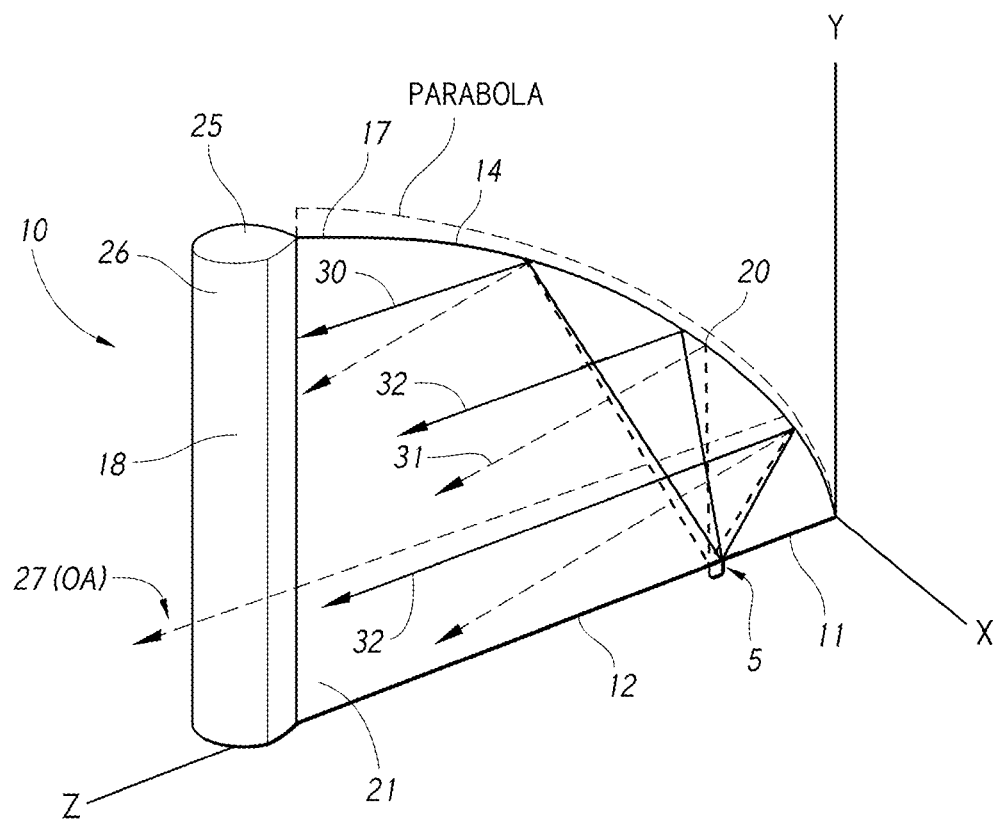
FIGS. 1-3 are views of one embodiment of the lightguide.
Figure 2:
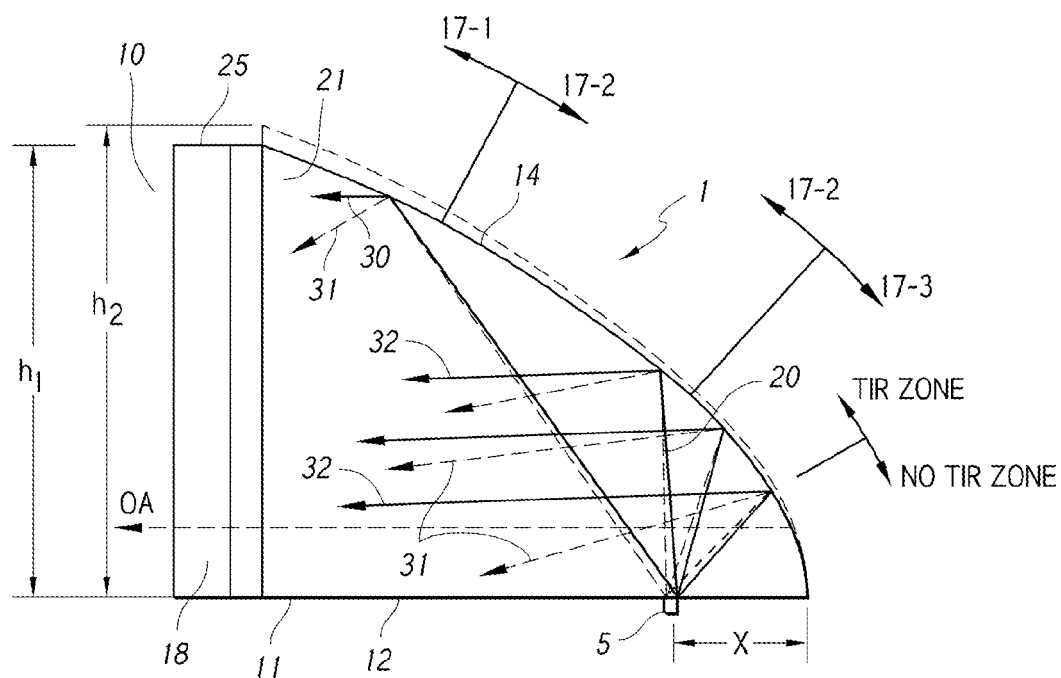
Figure 3:
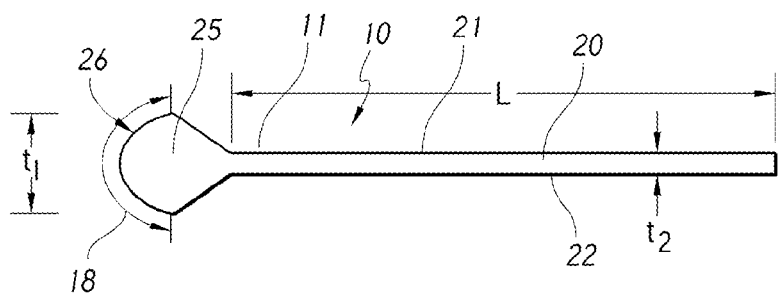

As shown in FIGS. 1-3, the lightguide 10 comprises a base 11 providing a light entrance surface 12, a rear edge surface 14, and an exit surface 18. The base 11 has a maximum length (L). The lightguide 10 has a maximum height (h1). The entrance surface 12 is shown extending along the Z axis, with the rear edge surface 14 and the exit surface 18 extending vertically in the Y axis direction. The rear edge surface 14 includes i) a TIR Zone that reflects light rays based on fundamentals of Total Internal Reflection (TIR) and ii) a no-TIR Zone where light rays do not meet critical angle requirements for TIR. The no-TIR Zone may be metalized.

As shown in cross section in FIG. 3, the lightguide 10 comprises a main guide portion 20 monolithically joined to an exit lens 25 with an exit profile 26. The main guide portion 20 and the exit lens 25 together provide an optical axis (OA) 27 originating at the rear edge surface 14. The optical axis 27 is the horizontal optical axis of the lightguide 10.

As illustrated in FIG. 3, in a cross section view, along the optical axis 27 and generally parallel to the light entrance surface 12, a maximum thickness (t1) of the exit lens 25 is greater than a maximum thickness (t2) of opposite planar lateral side faces 21, 22 of the main guide portion 20.

The main guide portion 20 is monolithically joined to the exit lens 25, the lightguide being a single piece of optical material.

The exit surface 18 is located on the exit lens 25. The entrance surface 12 and the rear edge surface 14 are located on the main guide portion 20. The light emitting element-receiving location 5 for the light source is located proximate the entrance surface 12 at a focal distance X from the rear edge surface 14. The exit surface 18 may be perpendicular to the arcuate profile 17.

This embodiment provides, when viewed from the side, a rear edge surface arcuate profile 17 defining a non-parabolic continuous convex arcuate curve, as shown in FIGS. 1-2. The non-parabolic continuous convex arcuate curve extends from i) a lowermost position of the rear edge surface 14 at the end of the base (11) to ii) a topmost end of the rear edge surface 14 at the maximum height h1 of the main guide portion 20. The arcuate profile 17 is convex in a direction away from the light source.

Modification of the rear edge surface arcuate profile 17 controls the vertical distribution of the beam pattern 40. Thus, different non-parabolic continuous convex arcuate curves, based on different modifications of the rear edge surface arcuate profile 17, define different horizontal cutoffs with different gradients. In the low beam embodiment, the rear edge surface arcuate profile 17 provides an overall vertical spread of at least 8 degrees. The rear edge surface arcuate profile 17 may be adjusted to provide a greater overall vertical spread so that the bottom of the light beam pattern extends down 8-15 degrees below the H-H line into the foreground. In a fog beam pattern, the overall vertical spread is at least 3 degrees, so that the overall vertical spread would extend down 3-10 degrees below the H-H line into the foreground. Practical implementation to create the rear edge surface arcuate profile defining the horizontal cutoff and vertical spread may be achieved by varying the rear edge surface arcuate profile 17.

Figure 4:
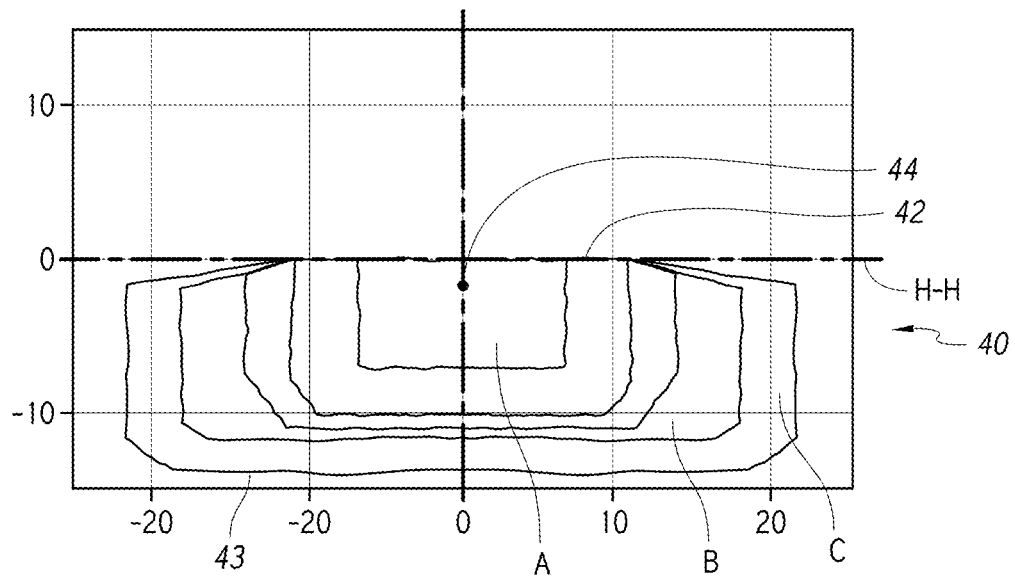
FIGS. 4-6 illustrated simulated beam patterns from the lightguide.
Figure 5:
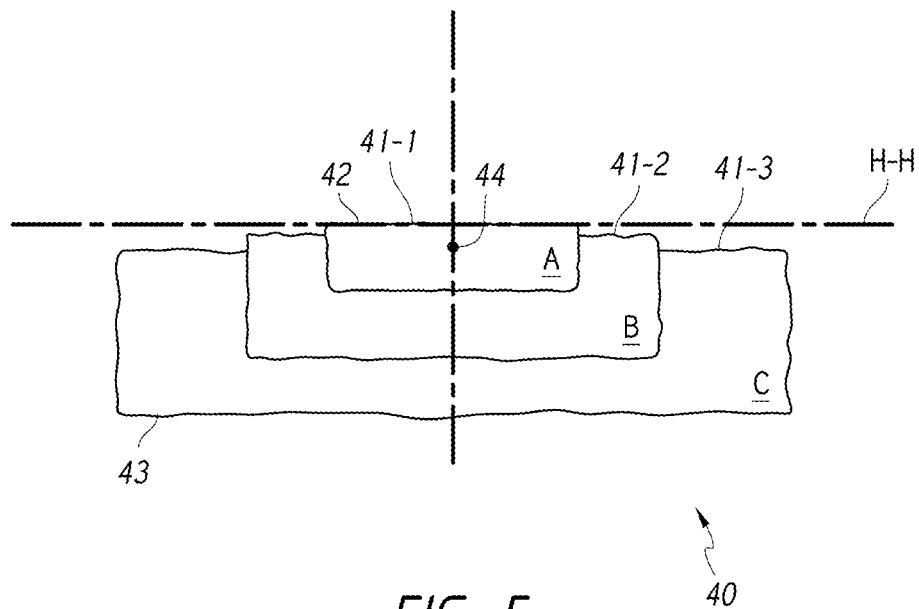

Light rays 30, 31, 32 from the light source 5 enter the main guide portion 20 through the entrance surface 12. The light rays 30, 31, 32 travel through the main guide portion 20, as shown in FIG. 2, towards the rear edge surface 14. Light rays 30, 31, 32 incident on the rear edge surface 14 are reflected and travel towards the exit surface 18. Based on the shape of the rear edge surface arcuate profile 17 and the focal distance X, some light rays 30 starting at the light emitting element-receiving location 5 will be reflected parallel to the optical axis 27, while other light rays 31, 32 will deviate from the optical axis based on the size of the light source and a distance of the light source, along the entrance surface 12, from the rear edge surface 14. Thus, the light rays 30 reflect parallel to the optical axis 27, whereas the light rays 31, 32 reflect downward with respect to the optical axis 27. The light rays 32 reflect less downward with respect to the optical axis as compared to the light rays 31. The non-parabolic nature of the rear edge surface arcuate profile 17 prevents light rays from reflecting upward, from the rear edge surface, with respect to the optical axis 27. Advantageously, the light rays 30, 31, 32 emitted from the light source reflect only a single time off the rear edge surface 14 and undergo multiple reflections off the opposite planar lateral side faces 21, 22 of the main guide portion 20 in traveling to the exit lens 25. This results in a lightguide 10, with the light beam pattern 40 being limited to below the horizontal optical axis H-H as shown in FIGS. 4-5. Thus, a sharp overall horizontal cutoff is provided. FIG. 4 shows a system of isolux curves.

The light beam pattern 40 provides a predetermined overall top horizontal cutoff 42 and a predetermined overall bottom horizontal cutoff 43 with respect to the horizontal optical axis H-H. The embodiment provide that the overall top horizontal cutoff 42 is located, unaimed, near the horizontal optical axis H-H (within two degrees of the horizontal optical axis H-H). See FIGS. 4 and 11. An unaimed position is with the light entrance surface 12 being horizontally oriented. The overall top horizontal cutoff is expressed as a horizontal cut-off gradient and is measured as a visual optical aim right (VOR) or a visual optical aim left (VOL) measurement.

The standard for measuring VOR and VOL is defined by Federal Motor Vehicle Safety Standard 108 (FMVSS 108) "S10.18.9.1.5 Measuring the cutoff parameter". This standard specifies that the headlamp is mounted on a headlamp test fixture which simulates its actual design location on any vehicle for which the headlamp is intended. The fixture, with the headlamp installed, is attached to a goniometer table in such a way that the fixture alignment axes are coincident with the goniometer axes. A vertical scan of the beam pattern is conducted for a headlamp with a left side gradient by aligning the goniometer on a vertical line at 2.5° L and scanning from 1.5° U to 1.5° D. For a headlamp with a right side gradient, a vertical scan of the beam pattern is conducted by aligning the goniometer on a vertical line at 2.0° R and scanning from 1.5° U to 1.5° D. The maximum gradient is determined within the range of the scan by using the formula: $G=\log E(a)-\log E(a+0.1)$, where "G" is the gradient, "E" is illumination and "a" is vertical angular position. The maximum value of the gradient "G" determines the vertical angular location of the cutoff.

In low beam embodiments, the overall top horizontal cutoff 42 of the light beam pattern 40 provides a horizontal cut-off gradient of at least 0.13 as the visual optical aim right (VOR) or the visual optical aim left (VOL) measurement. In fog beam embodiments, the overall top horizontal cutoff 42 of the light beam pattern 40 provides a horizontal cut-off gradient of at least 0.08 as the visual optical aim right (VOR) or the visual optical aim left (VOL) measurement. Preferred low beam embodiments provide a horizontal cut-off gradient in a range from 0.17-0.20 as the visual optical aim right (VOR) or the visual optical aim left (VOL) measurement. Higher gradients are also provided; however, the gradient being too high causes discomfort for a vehicle driver.

In various embodiments, the exit profile (contour) 26 is generally arcuate. The exit profile 26 controls horizontal distribution/spread (in the ZX plane) of the produced beam pattern 40, as shown in FIGS. 4 and 5. Thus, the different exit profiles 26 produce different horizontal spread patterns having different horizontal spreads, e.g., appropriate for low beam or fog beam. The exit profile 26 provides a horizontal spread of at least 20 degrees, preferably 25 degrees for low beam embodiments. The standard legal test points for low beam horizontal spread is 4 degrees down and 20 degrees right (4D-20R); and 4 degrees down and 20 degrees left (4D-20L). The exit profile 26 provides an overall horizontal spread of at least 25 degrees, preferably 30 degrees for fog beam embodiments.

Thus, the exit lens 25 images the light rays 30, 31 exiting from the main guide portion 20 into a particular desired beam pattern 40. A first arcuate exit profile 26 determines a horizontal spread of the light beam pattern 40 corresponding to a first vehicle lamp pattern (FIGS. 4-5), whereas a second arcuate exit profile 26 determines a horizontal spread of the light beam pattern 40 corresponding to a wider horizontal distribution width suitable as a fog beam vehicle lamp pattern (FIG. 6).

FIG. 4 is a simulated low beam pattern with a low beam gradient, in the unaimed position, for a lightguide having the base 11 length L and height h1. FIG. 4 illustrates an overall top horizontal gradient 42 formed at the horizontal optical axis H-H. The beam provides 52.8 total lumens with a maximum intensity of 1335.996 Candela at 2D-0.6L. The maximum intensity hot spot 44 is 2 degrees down from the horizontal H-H line. The horizontal cut-off gradient (simulated) is 1.4. Thus, there is a sharp overall top horizontal cutoff 42 at the H-H line. As noted above, a value that is too high causes driver discomfort. Thus, preferred low beam embodiments provide a horizontal cut-off gradient in a range from 0.17-0.20 as the visual optical aim right (VOR) or the visual optical aim left (VOL) measurement. In general, the embodiments provide the maximum intensity hot spot 44 located closer to the overall top horizontal cutoff 42 than the overall bottom horizontal cutoff of the light beam pattern 40, and within an upper 20% of the overall vertical spread of the light beam pattern 40.

FIG. 5 schematically corresponds to FIG. 4, in the unaimed position, showing a top horizontal cutoff 41-1, 41-2, 41-3 for the corresponding three light beam pattern regions A, B, C the top of light beam pattern regions A, B, and C together defining the overall top horizontal cutoff 42 of the light beam pattern 40. FIG. 5 also show the resulting beam pattern regions A, B, C.

Figure 6:
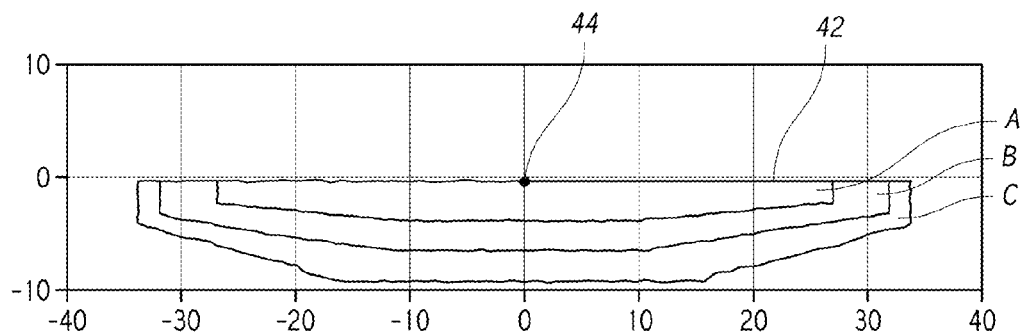

FIG. 6 is a simulated fog beam pattern with a horizontal gradient formed at the horizontal optical axis H-H, also for a lightguide having the base 11 length L and a height h1. Again, there is a sharp overall top horizontal cutoff 42 the H-H line. A 425 lumen LED was used for simulation, with a simulated gradient 0.17. As shown from the below data, the resulting distribution passes SAE Fog requirements (J583 April 2001) with total lumens of 255.9 and a maximum intensity of 11013.1 Candela at 1.62D-0.8L.

pattern regions B, C. For example, adjusting the shape of the rear edge arcuate profile 17 in each region 17-2 and 17-3 can eliminate the light rays 30 (reflecting parallel to the optical axis 30) in regions 17-2, 17-3, thereby positioning the top horizontal cutoff 41-1 for light beam pattern region A to be higher than the top horizontal cutoffs 41.2, 41.3 of light beam pattern regions B, C. It is noted that a greater number of light beam pattern regions could be identified, but three light beam pattern regions A, B, C are identified for simplification and convenience.

Figure 7:
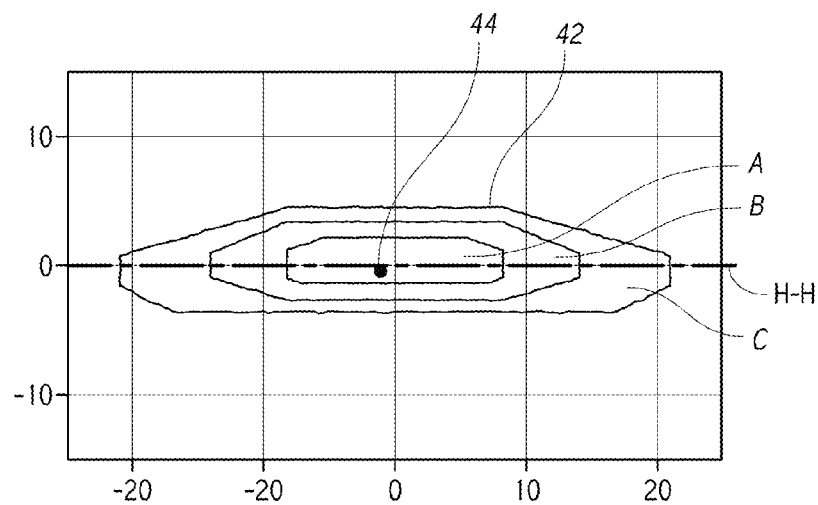
FIGS. 7-9 illustrates simulated beam patterns from a lightguide with a parabolic rear edge surface.

Prior Art FIG. 7 is a simulated beam pattern for lightguide, with the base 11 length L and a height h2, in an unaimed position, but with a parabolic rear edge surface (shown dashed super-imposed in FIGS. 1-2) such as illustrates in U.S. Pat. Appl. Pub 2009/0091944 (DeLamberterie) FIG. 3. This lightguide does not satisfy the requirements of either a low beam or a fog lamp, including horizontal distribution width. More specifically, in FIG. 7 the maximum intensity hot spot 44 is not located closer to the overall top horizontal cutoff than the overall bottom horizontal cutoff of the light beam pattern, or located within two degrees below the overall top horizontal cutoff 42. Nor is the maximum intensity hot spot 44 located within an upper 20% of the overall vertical spread of the light beam pattern. In FIG. 7, the overall top horizontal cutoff 42 of the light beam pattern is not located, unaimed, near the horizontal optical axis H-H.

Figure 8:
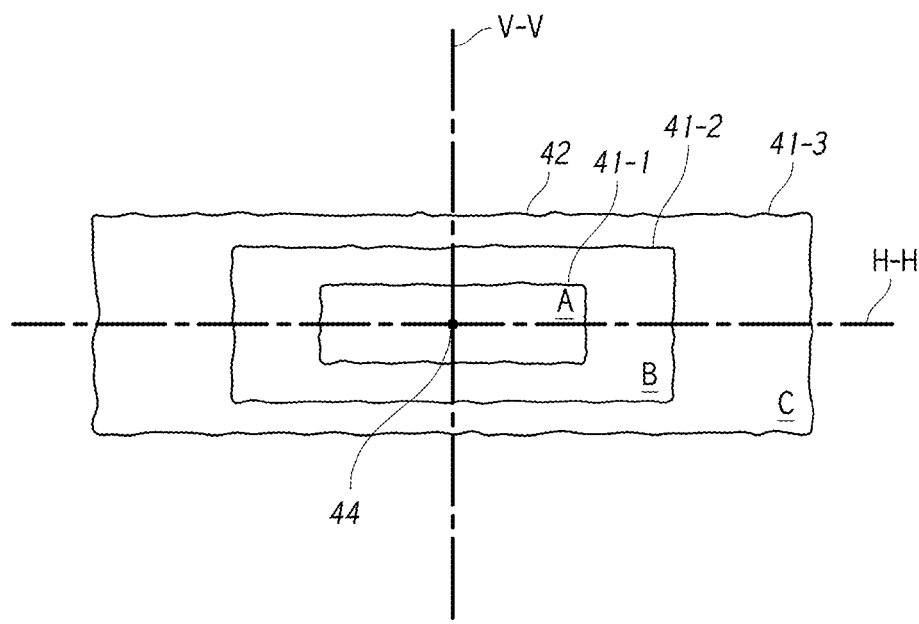
Figure 9:
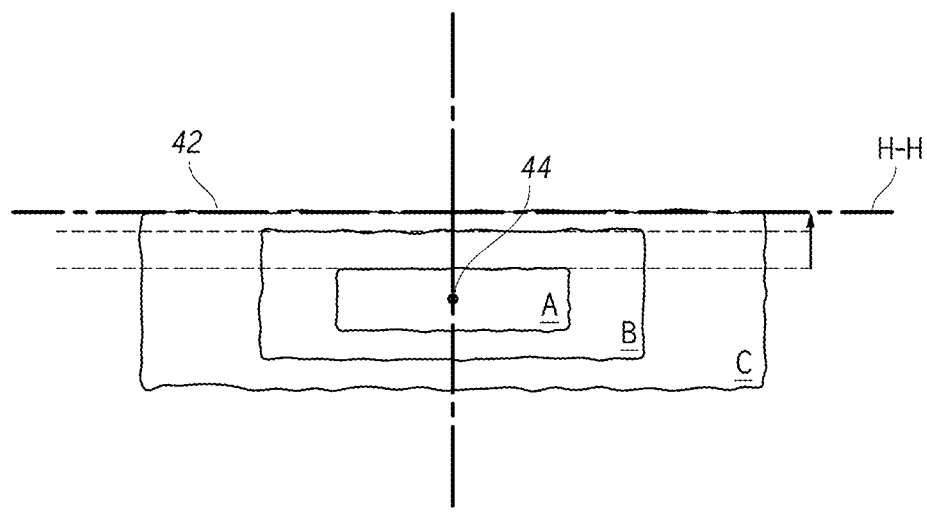

Prior Art FIG. 8 schematically corresponds to FIG. 7, in the unaimed position, showing the light beam pattern regions A, B, C being centered on H-V. FIG. 9 corresponds to the lightguide of FIG. 7, with the lightguide aimed downward so that the overall top horizontal cutoff 42 is aimed at the H-H line. Each light beam pattern region A, B, C has a corresponding top horizontal cutoff 41-1, 41-2, 41-3. Note that in FIG. 9, the top horizontal cutoff 41-1, 41-2, 41-3 of each of the light pattern regions A, B, C are not coincident (see horizontal dashed lines), but rather remain offset from one another as in FIG. 8. Although the FIG. 9 gradient (simulated) is 0.17, the maximum intensity hot spot 44 is 4.6 degrees down from the

| Point Name | Cd | Fail | Minimum | Maximum | Reaim or Max Location | Remeasured Cd |
|---|---|---|---|---|---|---|
| 10U-15L TO 15R | 14.1 | | | 125 | 10U-12.75R | |
| 2U-15L TO 15R | 5.1 | | | 240 | 2U-7.25L | |
| 1U-15L TO 15 R | 5.1 | | | 360 | 1U-3L | |
| H-10L TO 10R | 29.2 | | | 480 | H-8.75R | |
| 1.5D-3L | 9710.8 | | 2000 | 10000 | | |
| 1.5D-3R | 9643.0 | | 2000 | 10000 | | |
| 1.5D-9L | 8804.7 | | 1000 | | | |
| 1.5D-9R | 8594.2 | | 1000 | | | |
| 3D-15L | 3202.4 | | 1000 | | | |
| 3D-15R | 2939.4 | | 1000 | | | |

TEST RESULT: PASS

FIGS. 4-6 and 11 show three light beam pattern regions A, B, C corresponding to the rear edge surface arcuate profile 17 being divided into three consecutive regions, e.g., shown in FIG. 2 as upper region 17-1, middle region 17-2, and lower region 17-3. The exact size and shape of each region 17-1, 17-2, 17-3 is determined by the desired resulting light beam pattern regions, a desired location of a top horizontal cutoff 41-1, 41-2, 41-3 for the three light beam pattern regions A, B, C and gradient. Adjusting the shape of the rear edge arcuate profile 17 in each region 17-1, 17-2, 17-3 allows the top horizontal cutoff 41-1, 41-2, 41-3 for the three light beam pattern regions A, B, C to be coincident or to have the top horizontal cutoff 41-1 for light beam pattern region A to be higher than the top horizontal cutoffs 41.2, 41.3 of light beam horizontal H-H line. Thus, aiming the FIG. 7 lightguide (with the parabolic rear edge surface) will not result in a low beam or fog beam lightguide. The embodiment of the present disclosure illustrated by FIG. 4 has a gradient of 1.4 whereas the parabolic rear edge surface lightguide of FIG. 7, aimed downward as in FIG. 9, has a gradient of 0.17. Thus, the present disclosure can provide a gradient more than 8 times higher than the FIG. 7 lightguide with the parabolic rear edge surface.

In preferred embodiments exemplified by FIGS. 1-3, the maximum height h1 of the main guide portion 20 is in a range of 40-100 mm, with a preferred maximum h1 height of 70 mm. The maximum length L of the base 12 is in a range of 80 to 120 mm, with a preferred maximum length L of 70 mm.

The light emitting element-receiving location 5 on the light entrance surface 12 is positioned at a focal distance X in a range of 15-25 mm for the 70 mm height and 100 mm base length embodiment. The thickness between the opposite planar lateral side faces 21, 22 is in a range of 4 to 6 mm, and a maximum thickness t1 of the exit lens 25 is in a range of 4 to 6 mm. The ratio of T1 to T2 is at least 4 (T1/T2>4), and preferably >5.

Figure 10:
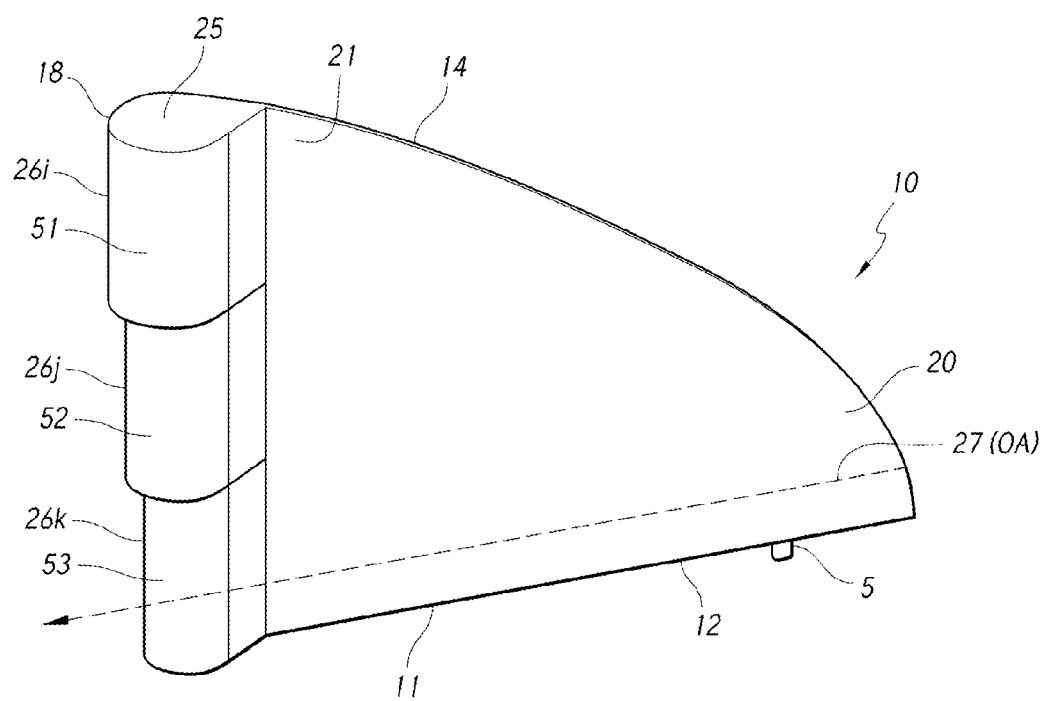
FIG. 10 illustrates another embodiment.
Figure 11:
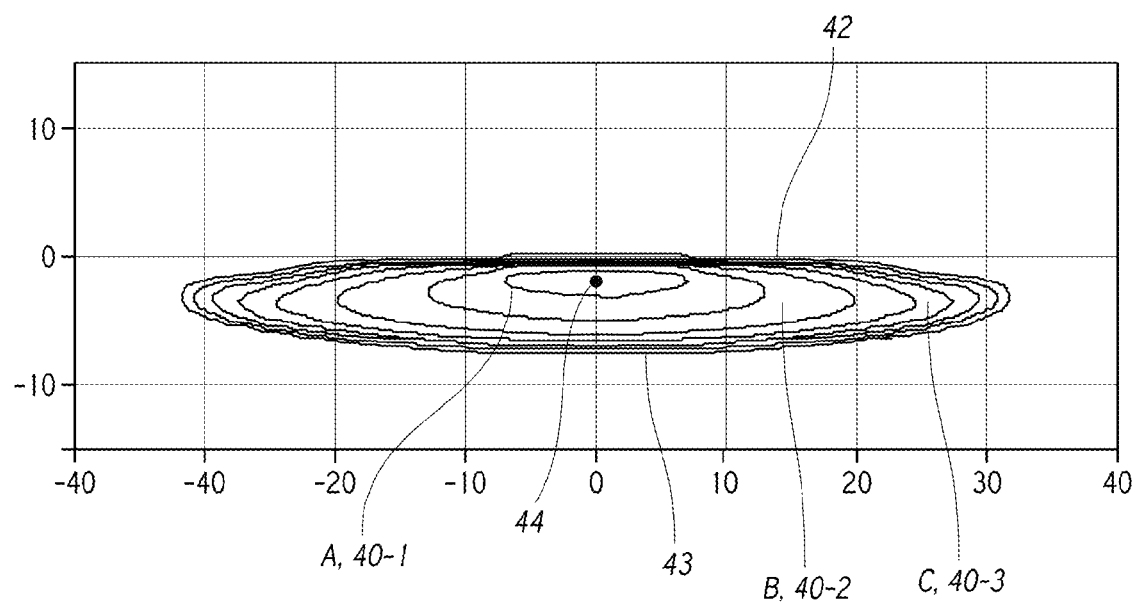
FIG. 11 is a simulated beam pattern for the embodiment of FIG. 10.

In another low beam embodiment, illustrated in FIGS. 10-11, for additional control of the horizontal light distribution/spread, the exit surface 18 of the exit lens 25 is divided into multiple discrete vertical zones 51, 52, 53 along the Z axis direction. The maximum thickness t1 or top zone 51 (with an arcuate exit profile 26i) is greater than the maximum thickness t1 of the middle zone 52 (with an arcuate exit profile 26j); and the maximum thickness t1 of the middle zone 52 is greater than the maximum thickness t1 of the bottom zone 52 (with an arcuate exit profile 26k).

The top zone 51 provides a hot spot beam pattern region 40-1 within beam pattern region A; the middle zone 52 provides a blend beam pattern region 40-2 (within beam pattern region B); and the bottom zone 53 provides a spread beam pattern region 40-3 (within beam pattern region C). See FIG. 11 showing a resulting beam pattern 40 similar to a SAE low beam with resulting beam pattern regions 40-1, 40-2, and 40-3. In order to allow some of the reflected light above the H-H line, a different sub-parabolic rear edge surface arcuate profile is used in this embodiment as compared to the embodiment of FIGS. 1-3.

In FIG. 11, the simulated beam pattern using the multiple discrete vertical zones 51, 52, 53 is shown. A beam pattern for a SAE low beam is illustrated having 600.6 total lumens and a maximum intensity hot spot 44 of 22662.48 Candela at 2D-V. The maximum intensity hot spot 44 is located 2 degree down from the horizontal H-H line. The gradient is 0.4 and the horizontal spread is over 30 degrees. Thus, this beam pattern meets criteria to produce a legal low beam.

Figure 12:
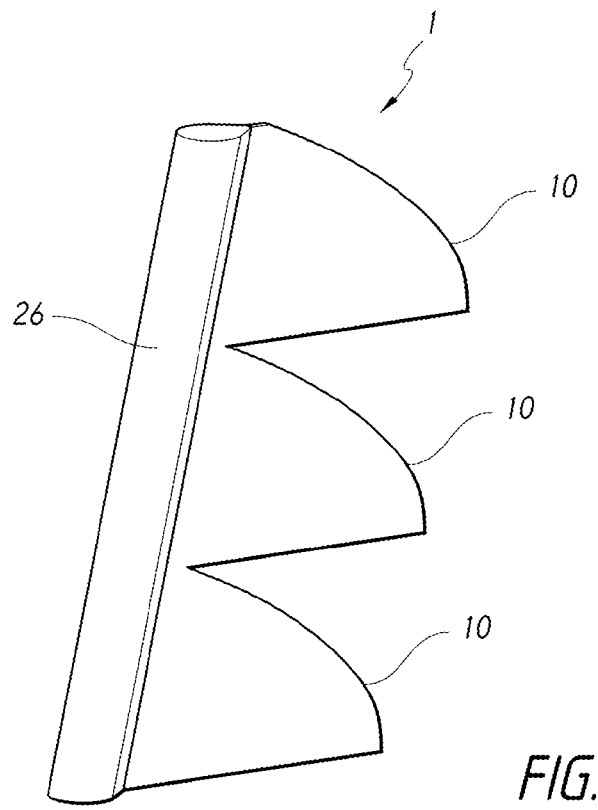
FIGS. 12-13 illustrate other embodiments.
Figure 13:
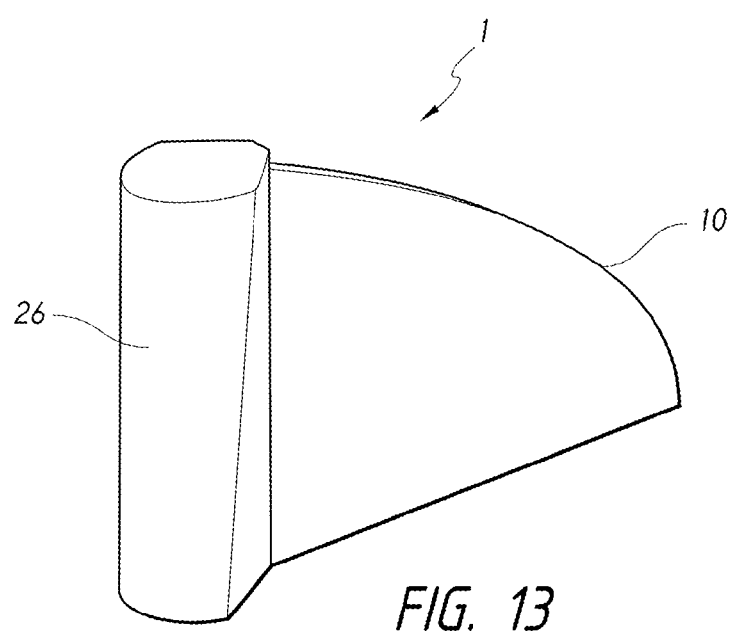

In other embodiments, e.g., FIG. 12, the exit lens 25 may be at an angle, together with multiple lightguides 10. Further, instead of constant or discrete zones, the exit surface 18 of the exit lens 25 may be provided with a progressive exit profile 26 shape forming a continuous surface having a variable spread along the vertical length as illustrated in FIG. 13.

While several embodiments of the present disclosure are described and illustrated herein, those of ordinary skill in the art will readily envision other means and/or structures for performing the functions and/or obtaining the results and/or one or more of the advantages described herein, and each such variation and/or modification is deemed within the scope of the present disclosure. All parameters, materials, and configurations described herein are exemplary and the actual parameters, materials, and/or configurations will depend upon the specific application for which the teachings of the present disclosure are used. Those skilled in the art will recognize, or be able to ascertain using no more than routine experimentation, many equivalents to the specific embodiments described herein. It is therefore understood that the foregoing embodiments are presented by way of example and that, within the scope of the appended claims and equivalents thereto, the disclosure may be practiced otherwise than as specifically described and claimed. The present disclosure is directed to each individual feature, system, kit, and/or method described herein. In addition, any combination of two or more such features, systems, kits, and/or methods, if such are not mutually inconsistent, is within the scope of the present disclosure.

All definitions, as defined and used herein, should be understood to control over dictionary definitions, definitions in documents incorporated by reference, and/or ordinary meanings of the defined terms.

The indefinite articles "a" and "an" as used herein in the specification and in the claims, unless clearly indicated to the contrary, are understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

THE FOLLOWING LISTS REFERENCE NUMERAL USED HEREIN 1 lighting device
5 light emitting element-receiving location for light source
10 lightguide
11 base
12 entrance surface
14 rear edge surface
17 rear edge surface arcuate profile
17-1, 17-2, 17-3 upper, middle and lower regions
18 exit surface
20 main guide portion
21, 22 planar faces
25 exit lens
26, 26i, 26j, 26k arcuate exit profiles
27 optical axis
30, 31, 32 light rays
40 beam pattern
40-1, 40-2, 40-3 hot spot, blend, and spread beam pattern regions
41-1, 41-2, 41-3, first, second, and third top horizontal cutoffs
42 overall top horizontal cutoff for the light beam pattern 40
43 overall bottom horizontal cutoff
44 maximum hot spot
51, 52, 53 vertical zones
A, B, C beam pattern regions

I claim:

1. An automotive lightguide for a vehicle lamp, comprising:
a main guide portion with a base providing a light entrance surface, a light emitting element-receiving location on the light entrance surface, and a rear edge surface, the main guide portion having a maximum height (h1), the rear edge surface presenting a rear edge surface arcuate profile defining a non-parabolic continuous convex arcuate curve extending from i) a lowermost position of the rear edge surface at an end of the base to ii) a topmost end of the rear edge surface at the maximum height h1 of the main guide portion; and
an exit lens joined to the main guide portion, the exit lens having an exit surface with an arcuate exit profile, a horizontal optical axis extending from the rear edge surface of the main guide portion through the exit surface of the exit lens, wherein,
in use, light rays emitting from a light source located at the light emitting element-receiving location enter the main guide portion through the entrance surface, travel through the main guide portion and reflect off an upper region, a middle region, and a lower region of the arcuate profile to the exit lens, the exit lens imaging the reflected light rays exiting via the exit surface of the exit lens as a light beam pattern with a predetermined overall top horizontal cutoff and a predetermined overall bottom horizontal cutoff of the light beam pattern with respect to the horizontal optical axis H-H, and the exit profile of the exit lens determines an overall horizontal spread of the light beam pattern;

wherein said upper region, said middle region and said lower region of said rear edge surface have different curvatures such that at least some of said light rays reflected off of these regions are not collimated and define different horizontal cutoffs;

said main guide portion further comprising a first lateral side face and a second lateral side face that is generally parallel to said first lateral side face, and further comprising a cross-section thickness that is less than a cross-sectional thickness of said exit lens;

said exit lens having a plurality of different exit profiles having a plurality of different thicknesses, respectively, so that light rays transmitted through said plurality of different exit profiles define different horizontal spreads.

2. The automotive lightguide of claim 1, wherein, a maximum intensity hot spot is located closer to the overall top horizontal cutoff than the overall bottom horizontal cutoff of the light beam pattern.

3. The automotive lightguide of claim 1, wherein, the overall top and bottom horizontal cutoffs of the light beam pattern define an overall vertical spread of the light beam pattern therebetween, and a maximum intensity hot spot is located within an upper 20% of the overall vertical spread of the light beam pattern.

4. The automotive lightguide of claim 1, wherein, the overall top horizontal cutoff of the light beam pattern is located, unaimed, near the horizontal optical axis H-H and provides a minimum horizontal cut-off gradient of 0.08 at the overall top horizontal cutoff of the light beam pattern, the horizontal cut-off gradient being measured as a visual optical aim right (VOR) measurement or a visual optical aim left (VOL) measurement.

5. The automotive lightguide of claim 3, wherein, the maximum intensity hot spot is located within two degrees below the overall top horizontal cutoff.

6. The automotive lightguide of claim 1, wherein the light beam pattern defines one of a low beam pattern and a fog beam pattern.

7. The automotive lightguide of claim 6, wherein the light beam pattern defines a low beam pattern with a horizontal spread of 25 degrees, the overall horizontal spread being 50 degrees, and an overall vertical spread being at least 8 degrees.

8. The automotive lightguide of claim 6, wherein the light beam pattern defines a fog beam pattern with a horizontal spread of 25 degrees, the overall horizontal spread being 50 degrees, and an overall vertical spread being at least 3 degrees.

9. The automotive lightguide of claim 6, wherein, the overall top horizontal cutoff of the light beam pattern provides a minimum horizontal cut-off gradient of 0.13 as a visual optical aim right (VOR) measurement or a visual optical aim left (VOL) measurement.

10. The automotive lightguide of claim 1, wherein, the exit profile and the upper region produce a first light beam pattern region (A) with a first top horizontal cutoff, a first horizontal distribution, and a first vertical distribution, the exit profile and the middle region produce a second light beam pattern region (B) with a second top horizontal cutoff, a second horizontal distribution, and a second vertical distribution, the second horizontal distribution being larger than the first horizontal distribution, the second vertical distribution being larger than the first vertical distribution, the exit profile and the lower region produce a third light beam pattern region (C) with a third top horizontal cutoff, a third horizontal distribution, and a third vertical distribution, the third horizontal distribution being larger than the second horizontal distribution, the third vertical distribution being larger than the second vertical distribution, and the first, second, and third top horizontal cutoffs of the first, second, and third light beam pattern regions (A, B, C) being approximately coincident and together defining the overall top horizontal cutoff of the light beam pattern.

11. The automotive lightguide of claim 10, wherein, a minimum gradient of 0.08, as a visual optical aim right (VOR) or a visual optical aim left (VOL) measurement, is provided from the first, second, and third top horizontal cutoffs of the first, second, and third light beam patterns regions (A, B, C).

12. The automotive lightguide of claim 10, wherein, the overall top horizontal cutoff of the light beam pattern, as defined by the first, second, and third top horizontal cutoffs of the first, second, and third light beam pattern regions (A, B, C), unaimed, is located near the horizontal optical axis H-H.

13. The automotive lightguide of claim 12, wherein, the overall top horizontal cutoff, unaimed, is located within two (2) degrees of the horizontal optical axis H-H.

14. The automotive lightguide of claim 12, wherein, the overall top horizontal cutoff of the light beam pattern provides a minimum horizontal cut-off gradient of 0.13 as a visual optical aim right (VOR) measurement or a visual optical aim left (VOL) measurement.

15. The automotive lightguide of claim 10, wherein, wherein the light beam pattern defines a low beam pattern, the exit surface of the exit lens comprises a plurality of discrete vertical zones in the vertical direction, a top zone defines the first light beam pattern region (A) as a hot spot beam pattern region of highest intensity as compared to the second and third light beam pattern regions (B, C), a middle zone defines the second light beam pattern region (B) as a blend beam pattern region of higher intensity as compared to the third light beam pattern region (C), and a bottom zone, defines the third light beam pattern region (C) as a spread beam pattern region.

16. The automotive lightguide of claim 15, wherein, the overall top horizontal cutoff of the light beam pattern provides a minimum horizontal cut-off gradient of 0.13 as a visual optical aim right (VOR) or a visual optical aim left (VOL) measurement.

* * * * *